United States Patent [19]
Jones et al.

[11] 3,862,248

[45] Jan. 21, 1975

[54] PURE 2,3,6-TRIMETHYLPHENOL

[75] Inventors: Donald C. Jones; Martin B. Neuworth, both of Pittsburgh, Pa.

[73] Assignee: Continental Oil Company, Ponca City, Okla.

[22] Filed: Oct. 2, 1968

[21] Appl. No.: 764,564

[52] U.S. Cl............................ 260/621 B, 260/624 R
[51] Int. Cl............................................ C07c 37/44
[58] Field of Search........ 260/621 A, 621 B, 627 G, 260/624 R

[56] References Cited
UNITED STATES PATENTS
2,435,087  1/1948  Luten et al. .................... 260/621 A

*Primary Examiner*—Leon Zitver
*Assistant Examiner*—Norman P. Morgenstern
*Attorney, Agent, or Firm*—Ronald J. Carlson; Robert S. Nisbett

[57] ABSTRACT

2,3,6-Trimethylphenol is recovered in high yield and high purity from its admixture with di- and tri-methyl-substituted phenols by subjecting the admixture to the sequential steps of butylation, fractional distillation, debutylation, and finally, fractional distillation.

3 Claims, 1 Drawing Figure

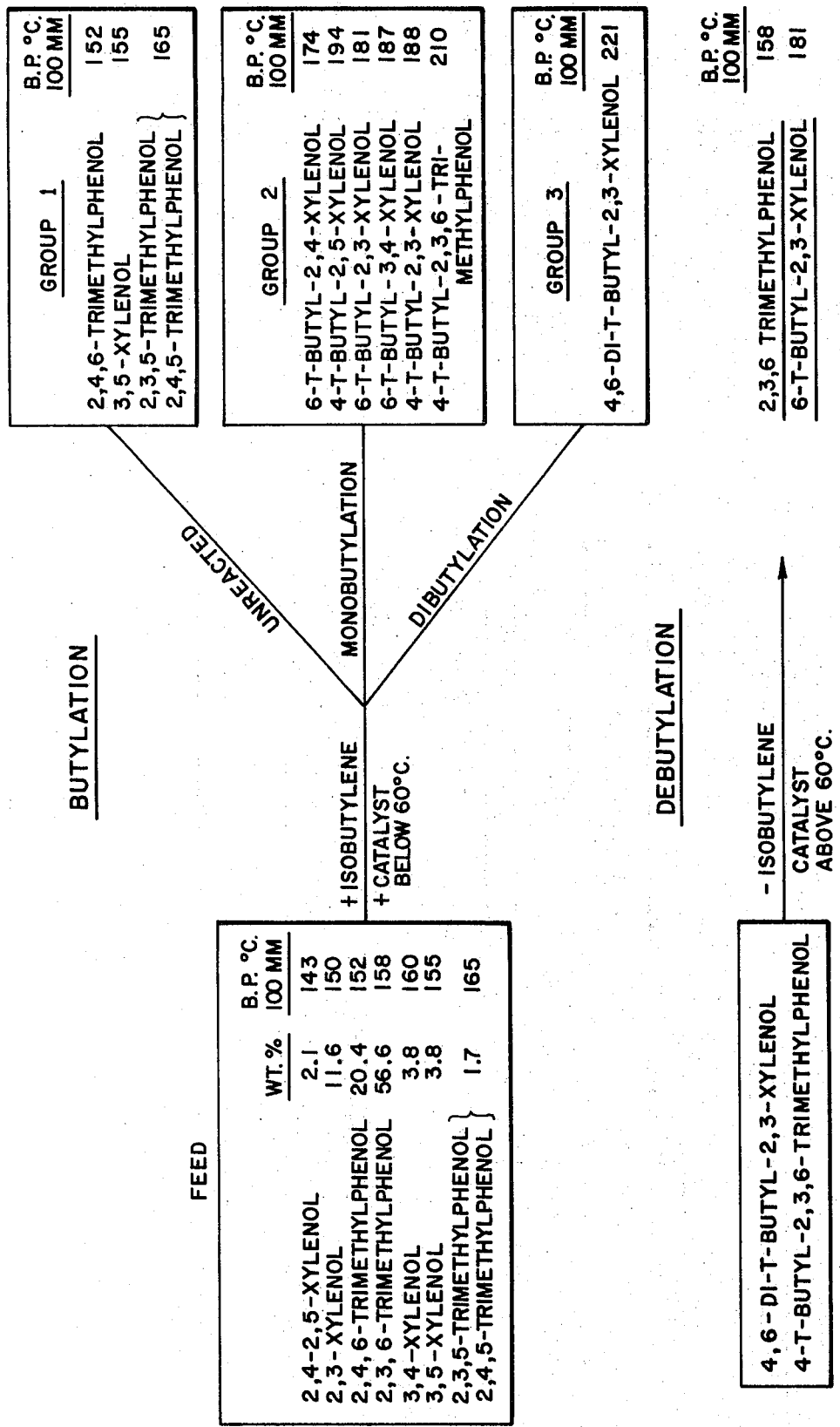

PURE 2,3,6-TRIMETHYLPHENOL

This invention relates to a process for separating 2,3,6-trimethylphenol from its admixture with closely boiling di- and tri-methyl-substituted phenols.

2,3,6-Trimethylphenol is useful as an intermediate in the commercial preparation of vitamin E. the compound is first converted to the corresponding trimethylhydroquinone (see Journal of Organic Chemistry, Vol. 4:318 et seq. (1939)). The latter is then converted to vitamin E (see Encyclopedia of Chemical Technology, Vol. 14:852).

Recovery of pure 2,3,6-trimethylphenol is difficult because it is usually produced in admixture with close boiling xylenols and isomeric trimethylphenols. Table I below tabulates those xylenols and isomeric trimethylphenols which have boiling points within a range of 25°C, including the boiling point of 2,3,6-trimethylphenol in about the middle of the range.

TABLE I

| Phenol | Boiling Points (°C) at | |
|---|---|---|
| | 100 mm | 760 mm |
| 2,4-Xylenol | 143 | 210 |
| 2,5-Xylenol | 143 | 210 |
| 2,3-Xylenol | 150 | 218 |
| 2,4,6-Trimethylphenol | 153 | 222 |
| 3,5-Xylenol | 155 | 219.5 |
| 2,3,6-Trimethylphenol | 158 | 226.7 |
| 3,4-Xylenol | 160 | 225 |
| 2,3,5-Trimethylphenol | 165 | 232 |
| 2,4,5-Trimethylphenol | 165 | 233 |
| 2,3,4-Trimethylphenol | — | 235.7 |
| 3,4,5-Trimethylphenol | — | 248–9 |

Separation by fractional distillation of the tabulated phenols is possible with varying degrees of success, depending upon the closeness of the respective boiling points. However, a very efficient column and considerable distillation time are required. Furthermore, in most instances, considerable recycle of off-fractions must be resorted to to obtain reasonable yields of 2,3,6-trimethylphenol.

The prior art teaches the use of the combination of alkylation-dealkylation and fractional distillation to effect separation of phenols. In particular, U.S. Pat. No. 2,435,087 granted Jan. 27, 1948 to Shell Development Company describes in great detail the application of such a combination to five different groups of close boiling phenols, including in Group E (Table IV) the compound 2,3,6-trimethylphenol. According to the Patentees, the compound 2,3,6-trimethylphenol is not alkylatable.

In accordance with the present invention, based upon our discovery that 2,3,6-trimethylphenol can be butylated, we have developed a process for separating 2,3,6-trimethylphenol from its admixture with at least one close boiling phenol selected from the class consisting of xylenols and trimethylphenols. In its broadest aspect, the process comprises the sequential steps of butylation, fractional distillation of the product butylate, debutylation of a selected fraction, and fractional distillation of the debutylate to recover 2,3,6-trimethylphenol of high purity.

More specifically, isobutylene is passed into the feedstock at a temperature less than 60° C., and preferably between 30° and 50° C. under butylating conditions whereby the 2,3,6-trimethylphenol is converted to 4-t-butyl-2,3,6-trimethylphenol. The product butylate is fractionally distilled to recover the fraction rich in the 4-t-butyl-2,3,6-trimethylphenol. This fraction is heated to a temperature between 60° and 125° C., and preferably to a temperature in the range of 80° to 110° C. under debutylating conditions whereby the 4-t-butyl-2,3,6-trimethylphenol is debutylated to 2,3,6-trimethylphenol which may then be recovered in extremely pure condition by fractional distillation.

If 2,3-xylenol is present in the feedstock, and it generally is present in substantial quantity, it is converted during the butylation step to a mixture of 6-t-butyl-2,3-xylenol and 4,6-di-t-butyl-2,3-xylenol. Much to our dismay, we discovered that the latter compound had a boiling point only 11° C. different from that the 4-t-butyl-2,3,6-trimethylphenol, i.e., only a 3° C. greater difference than that between their respective parent compounds. Accordingly, the fraction of the butylation product rich in the desired 4-t-butyl-2,3,6-trimethylphenol contained most of the original 2,3-xylenol in the form of its di-butylated derivative. We discovered, however, that at the debutylation temperatures recited above, while the 4-t-butyl-2,3,6-trimethylphenol is being converted to 2,3,6-trimethylphenol, the 4,6-di-t-butyl-2,3-xylenol is being converted to 6-t-butyl-2,3-xylenol. 2,3,6-Trimethylphenol and 6-t-butyl-2,3-xylenol having a boiling point difference of 23° C., thus making their separation by fractional distillation quite efficient.

For a better understanding of our invention, its objects and advantages, reference should be had to the accompanying drawing in which the process is illustrated schematically as applied to a typical mixture of methylated phenols, and also to the examples which follow the description of the drawing.

In the drawing, the recovery of pure 2,3,6-trimethylphenol from a typical mixture of methylated phenols is shown schematically. The feed consists of xylenols and isomeric trimethylphenols boiling in the range of about 140° to 165° C. at 100 mm. Hg. Generally, we prefer to feed to contain at least 40 percent by weight of 2,3,6-trimethylphenol. The major contaminants, it will be noted, are 2,3-xylenol and 2,4,6-trimethylphenol.

Isobutylene is bubbled into the feed under butylating conditions at a temperature below 60° C., and preferably between 30° and 50° C. The butylating conditions, except for temperatures, are those set forth in the aforementioned U.S. Pat. No. 2,435,087. That is, the catalyst may be any alkylation catalyst, generally an acidic catalyst, although we found sulfuric acid to be the best. Atmospheric pressure is preferred, but higher pressures do increase the conversion, but with some polymerization of the isobutylene which is undesirable.

Butylation of the feed divides the individual components of the feed mixture into three groups. Group 1 contains compounds which are not butylated and thus their boiling points are unaffected. Group 1 includes 2,4,6-trimethylphenol, 3,5-xylenol, 2,3,5-trimethylphenol and 2,4,5-trimethylphenol. Group 2 consists of components of the feed which monbutylate and includes the monobutyl derivatives of 2,4-xylenol, 2,5-xylenol, 2,3-xylenol, 3,4-xylenol and 2,3,6-trimethylphenol. Group 3 consists of the dibutylated components, only one in this instance, that is 4,6-di-t-butyl-2,3-xylenol.

The boiling points of the product compounds are listed adjacent the respective compound. It is quickly apparent that fractional distillation of the product mixture is considerably easier as a result of the significant spreading of all boiling points. The compounds which are most difficult to remove by fractional distillation, i.e., 2,4,6-trimethylphenol, 3,5-xylenol and 3,5-xylenol are either nonreactive to butylation or their butyl derivatives are easily separated from 4-t-butyl-2,3,6-trimethylphenol. The one exception is 4,6-di-t-butyl-2,3-xylenol, whose boiling point, 221° C. (at 100 mm. Hg), differs from that of 4-t-butyl-2,3,6-trimethylphenol, namely 210° C., by 11° C. This difference is only 3° C. greater than the difference in boiling points of the respectively parent compounds.

We have discovered, however, that selective debutylation of a mixture of 4,6-di-t-butyl-2,3-xylenol and 4-t-butyl-2,3,6-trimethylphenol can be effected so as to completely debutylate the 4-t-butyl-2,3,6-trimethylphenol to 2,3,6-trimethylphenol and at the same time remove only one butyl group from 4,6-di-t-butyl-2,3-xylenol.

The selective debutylation is accomplished by heating the mixture to a temperature between 60° and 125° C., preferably between 80° and 110° C. under debutylating conditions. Except for the specific temperatures recited, the debutylating conditions are conventional, and are well described, for example, in U.S. Pat. No. 2,297,588. We prefer to use concentrated sulfuric acid as the debutylating catalyst. The boiling point difference of the resulting mixture of 2,3,6-trimethylphenol and the mono-butyl-2,3-xylenol is 23° C. permitting complete separation of these two compounds by simple fractional distillation, to yield pure 2,3,6-trimethylphenol.

Any portion of the compounds in Group 2 which does not butylate due to incomplete conversion, will be readily recovered with the Group 1 compounds by fractional distillation. Since butylation of 2,3,6-trimethylphenol is not quantitative, the unreacted portion will be among those recovered with Group 1 compounds, and may be recycled to butylation. The highest boiling components of the butylation mixture, i.e., 4,6-di-t-butyl-2,3-xylenol and 4-t-butyl-2,3,6-trimethylphenol can be recovered as a distillation residue freed from lower boiling components and used directly for selective debutylation without any further purification.

EXAMPLE 1

A distillate fraction rich in 2,3,6-trimethylphenol was obtained by the fractional distillation of the product resulting from the reaction of phenol and methanol in the vapor phase at about 350° C. in the presence of activated alumina. The composition of the distillate fraction is shown in Table II below.

TABLE II

| Feed Composition | |
| --- | --- |
| Component | Wt. % |
| Phenol, cresol, 2,6-xylenol | 1.8 |
| Unidentified | 3.6 |
| 2,4-, 2,5-xylenol | 11.7 |
| 2,3-xylenol | 21.1 |
| 3,5-xylenol | 0.8 |
| 3,4-xylenol | 1.1 |
| 2,3,5-, 2,4,5-trimethylphenol | 0.2 |
| 2,4,6-trimethylphenol | 11.4 |
| 2,3,6-trimethylphenol | 48.4 |

A charge of the feed composition weighing 2,631 grams was butylated with isobutylene at 40° C. and atomspheric pressure using 5 weight percent of concentrated sulfuric acid (based upon total phenols present in mixture) as a catalyst. The weight of isobutylene absorbed was 1,276 grams. This amount was sufficient to monobutylate all the components of the feed which can be butylated, and to dibutylate the 2,3-xylenol.

The crude butylate was neutralized with caustic and washed with water to remove the acid catalyst. The neutralized crude butylate was topped in a fractionating column to remove unbutylated components and the monobutylated compounds except for 4-t-butyl-2,3,6-trimethylphenol. The final vapor temperature was 186° C. at 50 mm. Hg. At this point, 38 percent of the charge to fractionation was recovered as distillation residue. The residue analyzed as follows:

| | |
| --- | --- |
| 4-t-butyl-2,5-xylenol | 1.1% |
| 4-t-butyl-2,3,6-trimethylphenol | 59.8% |
| 4,6-di-t-butyl-2,3-xylenol | 37.9% |
| Unidentified | 1.2% |

The conversion of 2,3,6-trimethylphenol to its 4-t-butyl derivative was 68 percent. The 2,3-xylenol was converted to its butyl derivatives in a yield of 94 percent, of which 68 percent was di-t-butyl derivative.

The distillation residue was debutylated by heating with 1 weight percent (based upon the total butyl derivatives percent) of concentrated sulfuric acid from 65° to 110° C. over a 2-hour period and by holding at 110° C. for 1 hour. The reaction mixture was swept with nitrogen to assist in removal of isobutylene during the last 45 minutes.

The crude debutylate was washed free of acid with water and aqueous sodium carbonate. The neutralized product analyzed as follows:

| | |
| --- | --- |
| Mixed xylenols | 1.6% |
| 2,3,6-Trimethylphenol | 48.0% |
| 6-t-Butyl-2,3-xylenol | 32.9% |
| 4-t-Butyl-2,3,6-trimethylphenol | 7.9% |
| 4,6-Di-t-butyl-2,3-xylenol | 3.4% |
| Unidentified + loss | 6.2% |
| | 100.0% |

The debutylate was distilled to yield a 2,3,6-trimethylphenol fraction analyzing 96.9 percent purity in a yield of 93 percent. The overall yield of 2,3,6-trimethylphenol from the original feed was 54 percent.

EXAMPLE 2

A distillate fraction, also derived from the methylate product of the vapor phase reaction of phenol and methanol over activated alumina, and having the composition shown below in Table III was processed in the same manner as described in Example 1.

TABLE III

| Feed Composition | |
| --- | --- |
| Component | Wt.% |
| Unidentified | 0.9 |
| 3,5-Xylenol | 1.5 |
| 2,3-Xylenol | 9.1 |
| 3,4-Xylenol | 1.8 |
| 2,4,6-Trimethylphenol | 13.3 |
| 2,3,6-Trimethylphenol | 73.4 |

A batch of the above feed composition weighing 2,754 grams and containing 5 weight percent concentrated sulfuric acid based on the phenols present was butylated at 40° C. over a period of 4 hours. After three-fourths of the isobutylene was absorbed, an additional 1 percent H₂SO₄ catalyst was added. The butylated material was neutralized and fractionated. The conversions were as follows:

| | |
|---|---|
| 2,3,6-Trimethylphenol to 4-t-butyl-2,3,6-trimethylphenol | 65% |
| 2,3-Xylenol to 6-t-butyl-2,3-xylenol | 35% |
| 2,3-Xylenol to 4,6-di-t-butyl-2,3-xylenol | 48% |

The topped product was debutylated using 1 percent by weight of H₂SO₄ as catalyst. The mixture was heated from 65° to 110° C. during 2 hours and held at 110° C. for 1 hour. During three-fourths of the holding period, nitrogoen was sparged into the reaction mixture to assist in the removal of isobutylene.

The crude debutylated product was distilled in a fractionating column. The conversion of 4-t-butyl-2,3,6-trimethylphenol to 2,3,6-trimethylphenol was 90.7 percent and the recovery of 2,3,6-trimethylphenol from the debutylated mixture was 90.6 percent. The purity of the 2,3,6-trimethylphenol was 98.7 percent.

The foregoing examples illustrate the application of the present invention to admixtures of 2,3,6-trimethylphenol with a spectrum of closely boiling di- and tri-methyl-substituted phenols. Obviously, the invention may be applied even more successfully to mixtures containing a smaller number of components, in some instances only two, including of course 2,3,6-trimethylphenol. Such simpler mixtures may arise as by-products or side-fractions of other purification processes. For instance, as shown in the copending application of Del Bel, Jones and Neuworth entitled "Caustic Refining of 2,3,6-Trimethylphenol" and filed on even date herewith, a mixture consisting essentially of 2,3,6-trimethylphenol and 2,4,6-trimethylphenol in substantially equal proportions is obtained as a result of the caustic refining process described therein. Such a mixture is a desirable feedstock for the process of the present invention.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A process for separating 2,3,6-trimethylphenol from a mixture of xylenols and trimethylphenols containing 2,3-xylenol and at least 40 percent by weight of 2,3,6-trimethylphenol which comprises passing isobutylene into said mixture at a temperature below 60° C. under butylating conditions, to thereby produce a butylation product containing 4-t-butyl-2,3,6-trimethylphenol and 4,6-di-t-butyl-2,3-xylenol, fractionally distilling said butylation product to recover a fraction containing principally said 4-t-butyl-2,3,6-trimethylphenol and said 4,6-di-t-butyl-2,3-xylenol, heating said fraction to a temperature between 60° and 125° C. under debutylating conditions to effect selective debutylation of said 4-t-butyl-2,3,6-trimethylphenol to 2,3,6-trimethylphenol and of said 4,6-di-butyl-2,3-xylenol to 6-t-butyl-2,3-xylenol, and fractionally distilling said debutylation product to recover 2,3,6-trimethylphenol.

2. The process according to the process of claim 1 in which the butylation is conducted at a temperature between 30° and 50° C. and in the presence of concentrated sulfuric acid; and the debutylation is conducted at a temperature between 80° and 110° C. and in the presence of concentrated sulfuric acid.

3. The process according to the process of claim 2 in which said mixture of xylenols and trimethylphenols contains 2,4,6-trimethylphenol, 3,4-xylenol and 3,5-xylenol in addition to said 2,3,6-trimethylphenol and said 2,3-xylenol.

* * * * *